G. L. EASON.
Improvement in Watch-Case Spring-Attachment.
No. 131,670.  Patented Sep. 24, 1872.
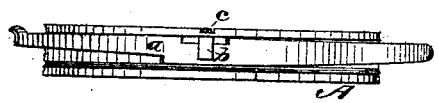
Fig. 5.
   
Fig. 1. Fig. 2. Fig. 3. Fig. 4.
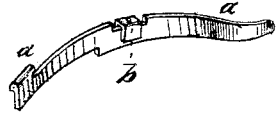
Fig. 6.

UNITED STATES PATENT OFFICE.

GEORGE L. EASON, OF DES MOINES, IOWA, ASSIGNOR OF ONE-HALF HIS RIGHT TO I. PARMELEE, OF SAME PLACE.

IMPROVEMENT IN WATCH-CASE SPRING ATTACHMENTS.

Specification forming part of Letters Patent No. 131,670, dated September 24, 1872.

*To all whom it may concern:*

Be it known that I, GEORGE L. EASON, of Des Moines, in the county of Polk and State of Iowa, have invented an Adjustable Fastener for Springs in Watch-Cases, of which the following is a specification:

The object of my invention is to save time and labor in fitting and securing springs in watch-cases. It consists in an adjustable fastener made and used, in combination with a spring, in the manner hereinafter fully set forth.

Figure 1 of my drawing is an enlarged perspective view of my fastener in the form of a slide or loop, open at the lower end, with a screw-hole in the top or closed end. It may vary in size and form to correspond with springs and cases of different sizes and shapes. Figs. 2, 3, and 4 are central sectional views, representing different forms of fasteners that can be used in place of Fig. 1 to accomplish the results contemplated by my invention. Fig. 5 is a perspective view of a part of a watch-case, and illustrates the manner of securing springs therein by means of my adjustable fastener.

A A is the common rim of a watch-case. B is the top or face-lid. *a a* are common springs. One is used to catch and lock the lid B to the rim A, and the other to press the lid open. *b b* are the sliding fasteners represented in Fig. 1. *c c* are screws passed through the rim A to reach and hold the springs *a a* when placed in the annular recess of the rim. A series of screw-holes in the top edge of the spring has heretofore been used as a means for adjusting and securing the spring in its place. It frequently occurs, however, that the holes in the spring and the holes in the rim will not register, and filing, drilling, and fitting must be resorted to in order to get the spring properly inserted and secured. By placing my adjustable fastener on the spring before the spring is placed in the recess, I provide a new and convenient means of securing the spring immediately by simply moving the fastener to the proper point for the admission of the screw *c* and then driving the screw in. The spring used for opening the lid B is represented in its proper place with the fastener *b* attached. By simply moving the fastener to the right and immediately under the point of the screw *c*, and driving the screw, the spring is securely locked in its proper position. The spring designed to clasp or lock the lid B when closed to the rim A is shown in position ready to be pressed into its proper place in the annular recess of the rim.

The fastener represented by Fig. 2 is a simple right angle in form. The screw used in connection with this form of fastener must be long enough to pass down on the side of the spring and clamp the spring against the long and vertical arm of the fastener. Fig. 3 is a modification of Fig. 1, showing a rest for the spring attached at the bottom. Fig. 4 is a modification of Fig. 2, showing a rest attached.

By the use of my adjustable fasteners screw-holes in the top edge of a spring can be dispensed with, and consequently the springs may be reduced in thickness. In instances where both springs are to be placed in one side of the rim, the rear ends may be cut off and then bent so as to press the rim in rear of and close to the fasteners. Long and heavy ends in rear of the point where fastened may be dispensed with in all cases where my fasteners are used. In addition, therefore, to saving time and labor in fitting and securing springs in watch-cases, I provide a practical means for using springs reduced in thickness, length, and weight, and of more simple and less costly form than those in general use.

Claim.

I claim as my invention—

The adjustable fastener represented by Figs. 1, 2, 3, and 4, when used in combination with a watch-case spring, substantially as described, and for the purposes specified.

GEORGE L. EASON.

Witnesses:
JOHN GOLDING,
D. V. COLE.